United States Patent
Kuo et al.

(10) Patent No.: US 8,073,419 B2
(45) Date of Patent: Dec. 6, 2011

(54) COHERENT TUNABLE FILTER APPARATUS AND WIRELESS COMMUNICATION FRONT-END CIRCUIT THEREOF

(75) Inventors: Chien-Nan Kuo, Pingtung County (TW); Horng-Yuan Shih, Taipei (TW); Yi-Hsin Pang, Kaohsiung County (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 861 days.

(21) Appl. No.: 12/126,941

(22) Filed: May 26, 2008

(65) Prior Publication Data
US 2009/0170456 A1 Jul. 2, 2009

(30) Foreign Application Priority Data

Dec. 28, 2007 (TW) ................. 96151016 A

(51) Int. Cl.
*H04B 1/16* (2006.01)
*H03F 3/04* (2006.01)

(52) U.S. Cl. ..... 455/334; 455/340; 455/341; 455/191.1; 330/302; 330/305

(58) Field of Classification Search ........ 455/160.1, 455/191.1, 194.2, 311, 334, 339, 340, 341; 330/302, 303, 305, 306, 307
See application file for complete search history.

(56) References Cited

U.S. PATENT DOCUMENTS

| | | | |
|---|---|---|---|
| 4,225,823 A | 9/1980 | Ogita | |
| 4,263,676 A * | 4/1981 | Liebel | 455/285 |
| 4,361,909 A * | 11/1982 | Theriault | 455/286 |
| 4,662,001 A * | 4/1987 | Cruz et al. | 455/340 |
| 5,437,051 A | 7/1995 | Oto | |
| 6,201,441 B1 * | 3/2001 | Suematsu et al. | 330/51 |
| 6,345,176 B1 | 2/2002 | Mattisson | |
| 6,553,216 B1 * | 4/2003 | Pugel et al. | 455/340 |
| 6,681,103 B1 * | 1/2004 | Rogers et al. | 455/302 |
| 7,187,913 B1 | 3/2007 | Rahn et al. | |
| 7,304,533 B2 * | 12/2007 | Hisayasu et al. | 327/553 |
| 2005/0218996 A1 | 10/2005 | Tamura | |
| 2008/0079497 A1 * | 4/2008 | Fang et al. | 330/302 |
| 2008/0287089 A1 * | 11/2008 | Alles | 455/339 |

FOREIGN PATENT DOCUMENTS

WO  WO 2007/057129  *  5/2007

OTHER PUBLICATIONS

"1st Office Action of China Counterpart Application", issued on Dec. 1, 2010, p. 1-p. 5.

* cited by examiner

*Primary Examiner* — Duc M Nguyen
(74) *Attorney, Agent, or Firm* — Jianq Chyun IP Office

(57) ABSTRACT

A front-end circuit with coherent tunable filters is provided. The circuit includes a first filter, an amplifier, and a second filter. The amplifier is coupled to the first filter, and the second filter is coupled to the amplifier. Furthermore, the amplifier is placed between the first and second filters. The first filter has a first tunable intermediate frequency, and is used to filter a received signal. The amplifier is used to amplify the output of the first filter. The second filter has a second tunable intermediate frequency, and is used to filter the output of the amplifier. The first and second intermediate frequencies have a coherent-tuning relation with each other.

26 Claims, 12 Drawing Sheets

US 8,073,419 B2

COHERENT TUNABLE FILTER APPARATUS AND WIRELESS COMMUNICATION FRONT-END CIRCUIT THEREOF

CROSS-REFERENCE TO RELATED APPLICATION

This application claims the priority benefit of Taiwan application serial no. 96151016, filed on Dec. 28, 2007. The entirety of the above-mentioned patent application is hereby incorporated by reference herein and made a part of specification.

BACKGROUND OF THE INVENTION

1. Field of the Invention

The present invention relates to a filter apparatus and a wireless communication front-end circuit thereof, in particularly to a coherent tunable filter apparatus and a wireless communication front-end circuit thereof.

2. Description of Related Art

Currently, the development of wireless communication technology brings about greater convenience to people's daily life, which enables users to surf the internet or communicate with others through portable devices outdoors or indoors. However, signals at various different frequencies are transmitted in the overall wireless channel. When a user intends to communicate with the wireless access terminal, signals can not be correctly sent and received unless at the designated frequency.

Generally speaking, a wireless communication front-end circuit includes a pre-filter and a post-filter. The pre-filter is generally used to filter an input signal of a low-noise amplifier, and the post-filter is used to filter an output signal of a low-noise amplifier. However, the conventional wireless communication front-end circuit provides the multiband and multimode options for different communication modes and frequencies. However, since the conventional wireless communication front-end circuit needs to integrate a plurality of filters, the overall hardware cost and the area are increased, which results in high power consumption.

FIG. 1 is a circuit diagram of a conventional wireless communication front-end circuit 10. Referring to FIG. 1, the wireless communication front-end circuit 10 is disclosed in the U.S. Pat. No. 6,345,176 B1 granted to the Ericsson Company in 2002. The wireless communication front-end circuit includes an antenna 100, a low-noise amplifier circuit 11, a low-current linear amplifier circuit 12, a control circuit 108, a selector 109, a local oscillator 110, and an intermediate frequency amplifier 107.

The antenna 100 is coupled to the low-noise amplifier circuit 11 and the low-current linear amplifier circuit 12. The selector 109 is coupled to the low-noise amplifier circuit 11, the low-current linear amplifier circuit 12, the control circuit 108, and the local oscillator 110. The intermediate frequency amplifier 107 is coupled to the low-noise amplifier circuit 11 and the low-current linear amplifier circuit 12.

The low-noise amplifier circuit 11 includes a low-noise amplifier 101, a low-noise mixer 102, and a low-noise intermediate frequency amplifier 103. The low-noise mixer 102 is coupled to the low-noise amplifier 101 and the low-noise intermediate frequency amplifier 103. The low-current linear amplifier circuit 12 includes a low-current linear amplifier 104, a low-current linear mixer 105, and a low-current linear intermediate frequency amplifier 106. The low-current linear mixer 105 is coupled to the low-current linear amplifier 104 and the low-current linear intermediate frequency amplifier 106.

The control circuit 108 controls the selector 109, such that the carrier wave generated by the local oscillator 110 may be mixed with the output of the low-noise amplifier 101 or the low-current linear amplifier 104 through the low-noise mixer 102 or the low-current linear mixer 105. However, such wireless communication front-end circuit 10 needs a plurality of amplifiers, which leads to a higher cost, larger hardware area, and more power consumption.

FIG. 2 is a circuit diagram of another wireless communication front-end circuit 20. Referring to FIG. 2, the wireless communication front-end circuit 20 is disclosed in the U.S. Pat. No. 4,225,823 B1 granted to the Nippon Gakki Seizo Kabushiki Kausha in 1980. The wireless communication front-end circuit 20 is adapted to a frequency modulation (FM) receiver, and includes a first front-end circuit 21, a second front-end circuit 22, a local oscillator 23, and selectors 24 and 25. The selector 24 is coupled to the first front-end circuit 21 and the second front-end circuit 22. The local oscillator 23 is coupled to the first front-end circuit 21 and the second front-end circuit 22. The selector 25 is coupled to the first front-end circuit 21 and the second front-end circuit 22.

The first front-end circuit 21 includes coils 210, 214, high-frequency filters 211, 213, an amplifier 212, and a mixer 215. The coil 210 is coupled to the selector 24. The amplifier 212 is coupled to the high-frequency filters 211, 213. The coil 214 is coupled to the mixer 215. The mixer 215 is coupled to the selector 25 and the local oscillator 23. The second front-end circuit 22 includes high-frequency filters 220, 222, an amplifier 221, and a mixer 223. The high-frequency filter 220 is coupled to the selector 24. The amplifier 221 is coupled to the high-frequency filters 220, 222. The high-frequency filter 222 is coupled to the mixer 223. The mixer 223 is coupled to the selector 25 and the local oscillator 23.

The selector 24 is controlled by a first control signal, and the selector 25 is controlled by a second control signal. The selector 24 sends a received signal Input_sig to the first front-end circuit 21 or the second front-end circuit 22, and an output signal Output_sig of the selector 25 is an output of the first front-end circuit 21 or the second front-end circuit 22. All the high-frequency filters 211, 213, 222, 220 may tune the receiving frequency, and the local oscillator 23 may also tune the carrier frequency of the output.

The filters 211, 213, 220, 222 of the wireless communication front-end circuit 20 have different Q factors, and the wireless communication front-end circuit 20 controls the selectors 24, 25 through the first and second control signals, and selects the first front-end circuit 21 or the second front-end circuit 22 as the output according to the strengths of the signal and the interference signal, so as to achieve an optimal signal-to-noise ratio. However, the wireless communication front-end circuit 20 needs a plurality of filters, which leads to a higher cost, larger hardware area, and more power consumption.

FIG. 3 is a circuit diagram of still another conventional wireless communication front-end circuit 30. Referring to FIG. 3, the wireless communication front-end circuit 30 is disclosed in the U.S. Pat. No. 5,437,051 granted to Toshiba Company in 1995. The wireless communication front-end circuit 30 includes a signal separator 31, a low-frequency front-end circuit 32, a high-frequency front-end circuit 33, a local oscillator 34, selectors 35a, 35b, a first intermediate frequency amplifier 36, an intermediate frequency filter 37, a second intermediate frequency amplifier 38, and a demodulator 39.

The signal separator 31 is coupled to the low-frequency front-end circuit 32 and the high-frequency front-end circuit 33. The local oscillator 34 is coupled to the low-frequency front-end circuit 32 and the high-frequency front-end circuit 33. The selector 35a is coupled to the low-frequency front-end circuit 32 and the high-frequency front-end circuit 33. The first intermediate frequency amplifier 36 is coupled to the selector 35a. The intermediate frequency filter 37 is coupled to the first intermediate frequency amplifier 36. The second intermediate frequency amplifier 38 is coupled to the intermediate frequency filter 37. The demodulator 39 is coupled to the second intermediate frequency amplifier 38. The selector 35b is coupled to the demodulator 39.

The low-frequency front-end circuit 32 includes a first low-frequency amplifier 320, a first attenuator 321, a second low-frequency amplifier 322, a low-frequency filter 323, a mixer 324, and a buffer amplifier 325. The first low-frequency amplifier 320 is coupled to the signal separator 31. The first attenuator 321 is coupled to the first low-frequency amplifier 320. The second low-frequency amplifier 322 is coupled to the first attenuator 321. The low-frequency filter 323 is coupled to the second low-frequency amplifier 322. The mixer 324 is coupled to the selector 35a, the buffer amplifier 325, and the low-frequency filter 323. The buffer amplifier 325 is coupled to the local oscillator 34.

The high-frequency front-end circuit 33 includes a first high-frequency amplifier 330, a second attenuator 331, a second high-frequency amplifier 332, a high-frequency filter 333, a mixer 334, and a buffer amplifier 335. The first high-frequency amplifier 330 is coupled to the signal separator 31. The second attenuator 331 is coupled to the first high-frequency amplifier 330. The second high-frequency amplifier 332 is coupled to the second attenuator 331. The high-frequency filter 333 is coupled to the second high-frequency amplifier 332. The mixer 334 is coupled to the selector 35a, the buffer amplifier 335, and the high-frequency filter 333. The buffer amplifier 335 is coupled to the local oscillator 34.

The signal separator 31 separates the received signal input_sig into a low-frequency signal and a high-frequency signal, and sends the low-frequency signal to the low-frequency front-end circuit 32 and sends the high-frequency signal to the high-frequency front-end circuit 33. The first and second attenuators 321, 331 may attenuate the noises. The selectors 35a, 35b are respectively controlled by a first control signal and a second control signal. The demodulator 39 outputs two demodulation signals 39a, 39b with different polarities, and the polarities are relevant to the fact that the selector 35a selects the high-frequency front-end circuit 33 or the low-frequency front-end circuit 32.

The wireless communication front-end circuit 30 controls the selector 35a through the first control signal to select the output of the high-frequency signal or the low-frequency signal to achieve the function of selecting the frequency signal. However, the wireless communication front-end circuit 30 needs a plurality of filters and amplifiers, which leads to a higher cost, larger hardware area, more power consumption and increased hardware complexity.

In addition, a wireless communication front-end circuit is disclosed in U.S. Pat. No. 7,187,913 granted to the SiGe Semiconductor Company in 2007, and the front-end circuit has a filter array controlled through a control interface, such that the front-end circuit can select among the frequency band to be received. However, the filter array has a larger area, higher cost, and more power consumption, which goes against the current trend of "light, thin, short, small" and power-saving communication electronics.

The present invention provides a wireless communication front-end circuit and a coherent tunable filter apparatus adapted to the wireless front-end circuit.

SUMMARY OF THE INVENTION

The present invention provides a front-end circuit with coherent tunable filters, which includes a first filter, an amplifier, and a second filter. The amplifier is coupled to the first filter, the second filter is coupled to the amplifier, and the amplifier is placed between the first and second filters. The first filter has a first tunable intermediate frequency, and is used to filter a received signal. The amplifier amplifies an output of the first filter. The second filter has a second tunable intermediate frequency, and is used to filter an output of the amplifier. The first and second intermediate frequencies have a coherent-tuning relation with each other.

The present invention provides a filter apparatus adapted to a wireless communication front-end circuit, which includes a first filter and a second filter. The first filter has a first tunable intermediate frequency, and is used to filter an input of the first filter. The second filter is coupled to the first filter, and has a second tunable intermediate frequency, and is used to filter an input of the second filter. The first and second intermediate frequencies have a coherent-tuning relation with each other.

The present invention provides a front-end circuit with coherent tunable filters, which includes an input end, an output end, a ground end, a transistor, a variable capacitor, and a variable inductor. The transistor is coupled to the input end, the output end, and the ground end. The variable capacitor is coupled to the output end, and the variable inductor is also coupled to the output end. The transistor has a parasitic capacitor placed between the input end and the output end. The parasitic capacitor and the transistor form a first filter at the input end, and the variable capacitor, the variable inductor, and the transistor form a second filter at the output end. The first filter and the second filter respectively have a first tunable intermediate frequency and a second tunable intermediate frequency. The first and second intermediate frequencies have a coherent-tuning relation with each other.

Since the first and second filters with the coherent-tuning relation are adopted in the present invention, the front-end circuit and the filter apparatus in the embodiments of the present invention may be applied to the multiband and multimode communication without using a plurality of filters and amplifiers as compared with the conventional front-end circuit and filter apparatus.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
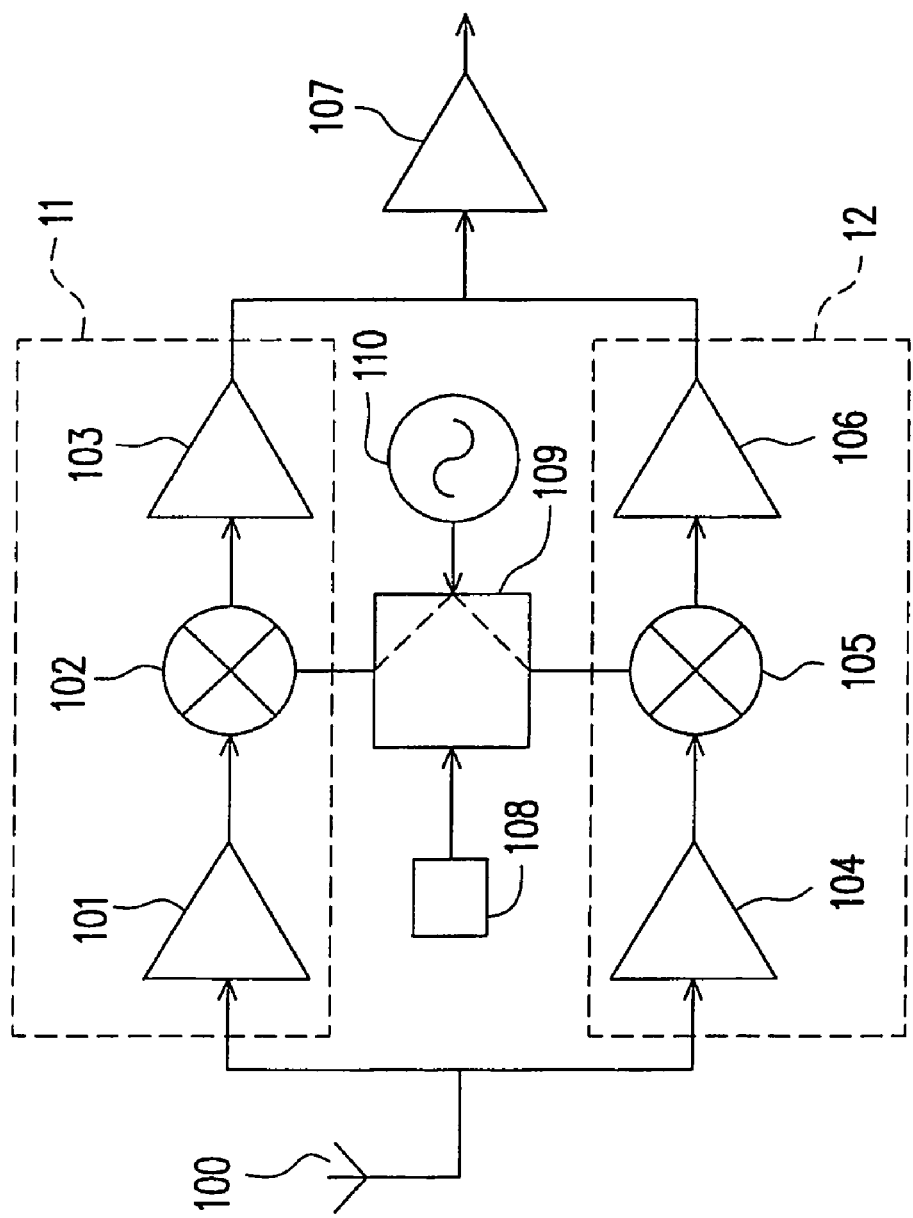
FIG. 1 is a circuit diagram of a conventional wireless communication front-end circuit 10.
Figure 2:
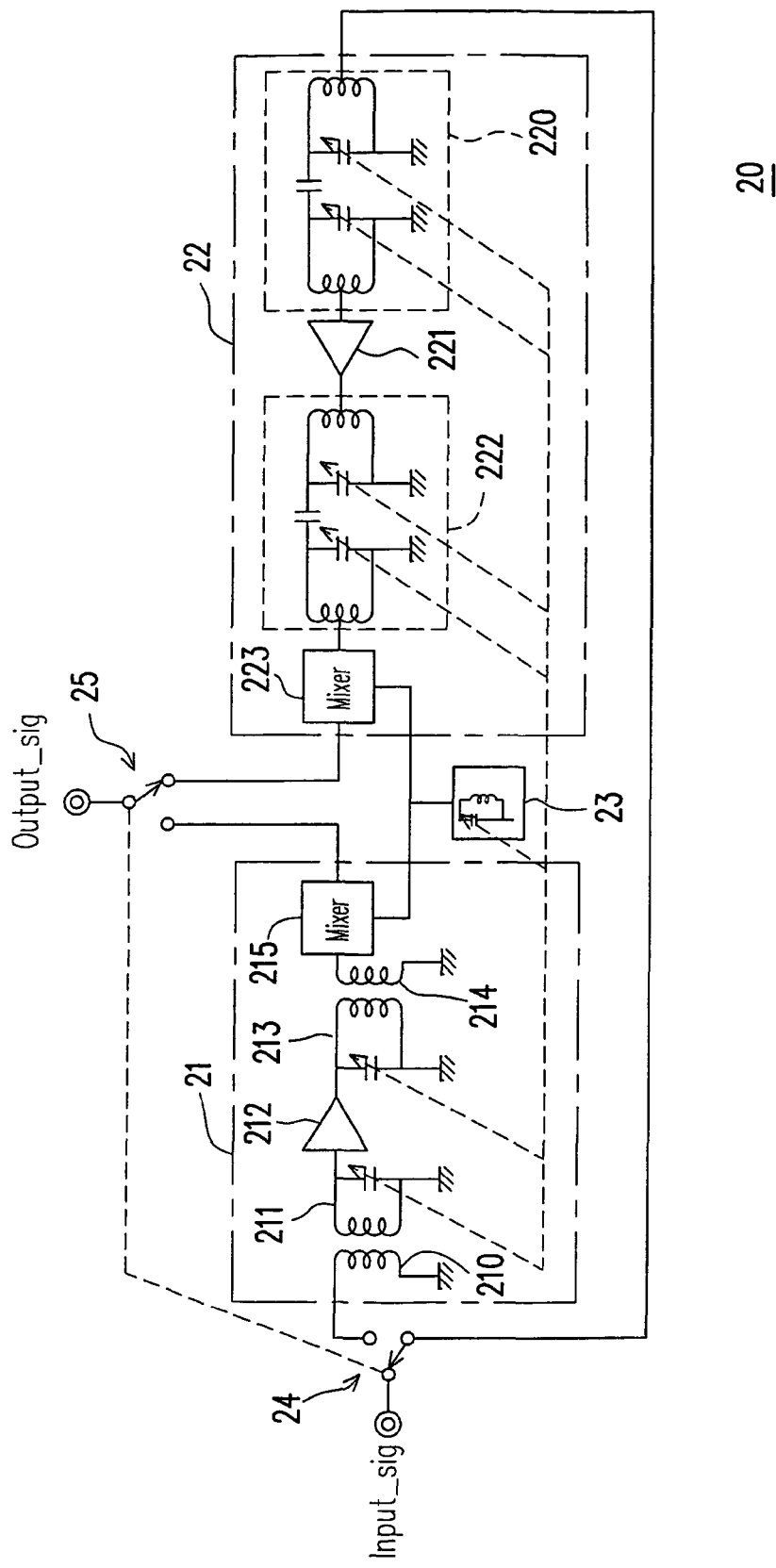
FIG. 2 is a circuit diagram of another conventional wireless communication front-end circuit 20.
Figure 3:
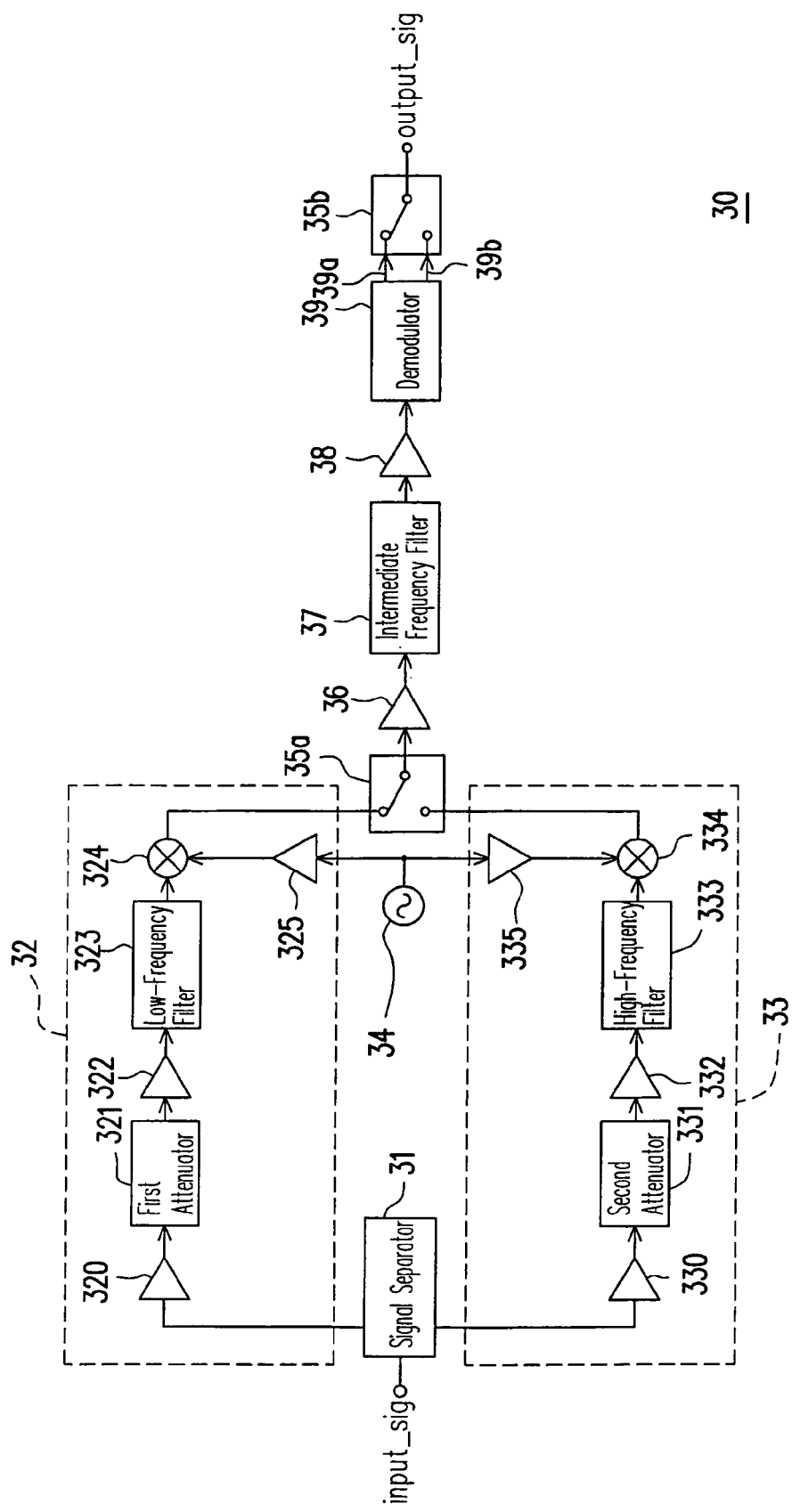
FIG. 3 is a circuit diagram of still another conventional wireless communication front-end circuit 30.

Reference will now be made in detail to the present preferred embodiments of the invention, examples of which are illustrated in the accompanying drawings. Wherever possible, the same reference numbers are used in the drawings and the description to refer to the same or like parts.

The embodiment of the present invention provides a front-end circuit with coherent tunable filters.

Figure 4:
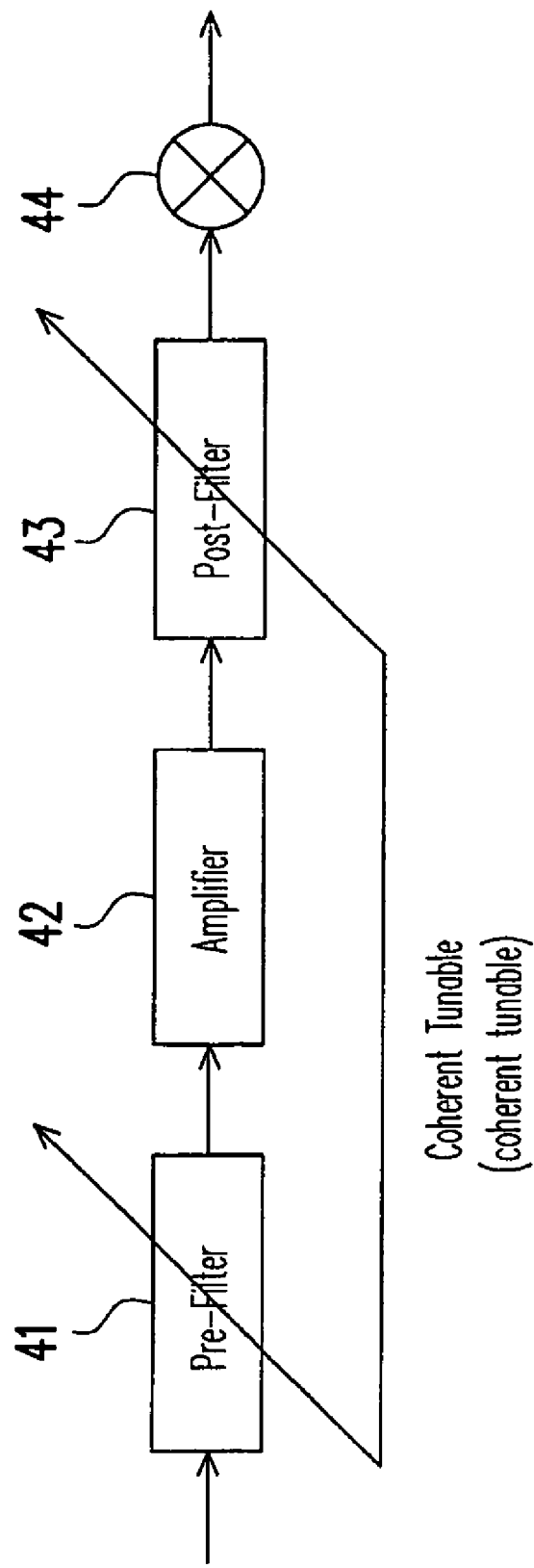
FIG. 4 is a circuit diagram of a front-end circuit 40 provided by an embodiment of the present invention.

FIG. 4 is a circuit diagram of a front-end circuit 40 provided by an embodiment of the present invention. Referring to FIG. 4, the front-end circuit 40 includes a pre-filter 41, an amplifier 42, and a post-filter 43. The amplifier 42 is coupled to the pre-filter 41, the post-filter 43 is coupled to the amplifier 42, and the amplifier 42 is placed between the pre-filter 41 and the post-filter 43. The pre-filter 41 has a first tunable intermediate frequency, and is used to filter a received signal. The amplifier 42 amplifies an output of the pre-filter 41. The post-filter 43 has a second tunable intermediate frequency, and is used to filter an output of the amplifier 42. The first and second intermediate frequencies have a coherent-tuning relation with each other.

The front-end circuit 40 further includes a mixer 44 coupled to the post-filter 43, for mixing an output of the post-filter 43. In this embodiment, the first intermediate frequency equals to the second intermediate frequency. Since the first and second intermediate frequencies have a coherent-tuning relation with each other, the first intermediate frequency is tuned accordingly when the second intermediate frequency is tuned, and vice versa. Furthermore, in this embodiment, the amplifier 42 may be a low-noise amplifier or a common amplifier.

When the first and second intermediate frequencies are tuned to the frequency to be received, the pre-filter 41 filters interference signals at other frequencies, and thus the linearity requirement of the amplifier 42 is lowered. The post-filter 43 further filters the output of the amplifier 42, so as to reduce the linearity requirement of the mixer 44. The front-end circuit 40 is adapted to different kinds of wireless communication systems, in which one front-end circuit 40 may be shared by a plurality of wireless communication systems, as long as the first and second intermediate frequencies are tuned to the required frequency, and thus greatly reducing the hardware complexity, the chip area, and the manufacturing cost.

Figure 5A:
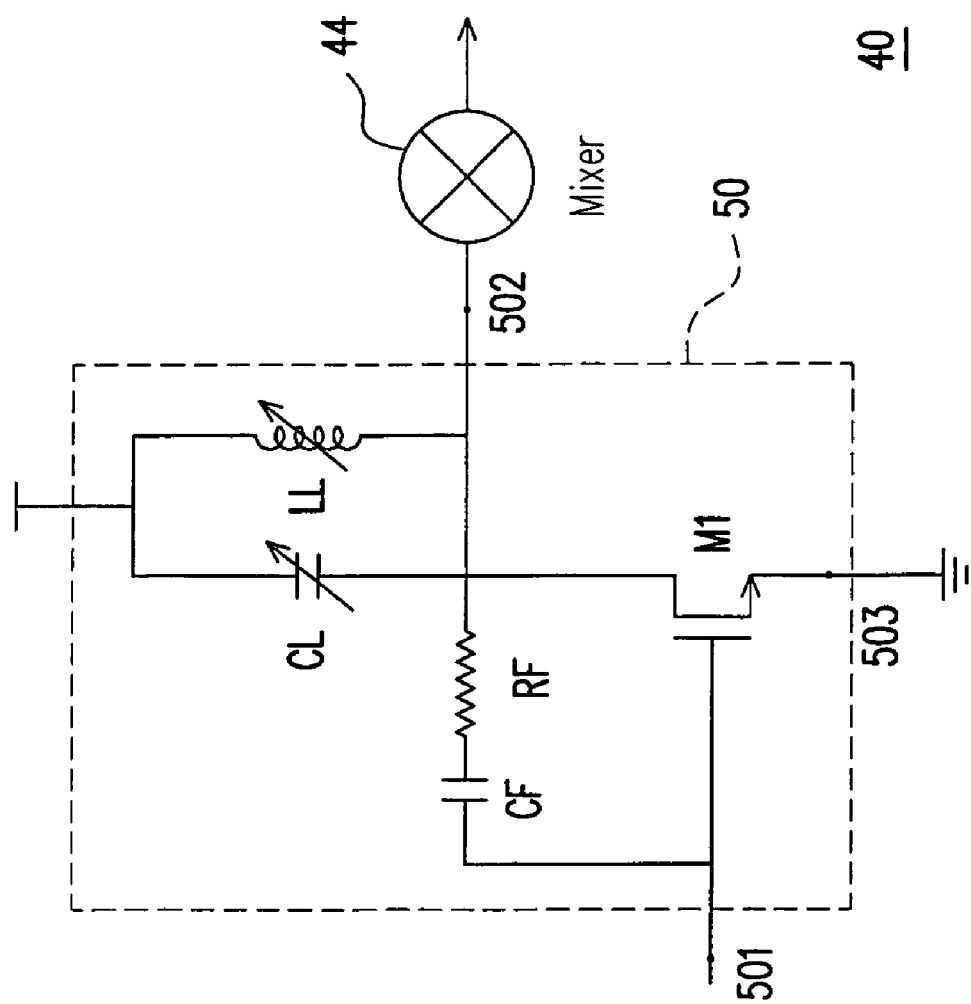
FIG. 5a is a circuit diagram of an integrated circuit 50 of a pre-filter 41, an amplifier 42, and a post amplifier 43.

The pre-filter 41, the amplifier 42, and the post amplifier 43 in the front-end circuit 40 may be implemented by an integrated circuit. FIG. 5a is a circuit diagram of an integrated circuit 50 of a pre-filter 41, an amplifier 42, and a post amplifier 43. Referring to FIG. 5a, the integrated circuit 50 includes an input end 501, an output end 502, a ground end 503, an n-type metal-oxide-semiconductor (NMOS) transistor M1, a feedback resistor CF, a feedback capacitor RF, a variable capacitor CL, and a variable inductor LL. The NMOS transistor M1 is coupled to the input end 501, the output end 502, and the ground end 503. The feedback resistor RF is coupled between the output end 502 and the input end 501. The feedback capacitor CF is coupled between the output end 502 and the input end 501. The variable capacitor CL is coupled to the output end 502, and the variable inductor LL is also coupled to the output end 502. The feedback resistor RF and the feedback capacitor CF are connected in series.

In this embodiment, a drain end of the transistor M1 is coupled to the output end 502, a source end of the NMOS transistor M1 is coupled to round end 503, and a gate end of the transistor M1 is coupled to the input end 501. However, the NMOS transistor M1 is not intended to limit the scope of the present invention.

The NMOS transistor M1 of the integrated circuit 50 is used as a common-source amplifier. The feedback resistor RF, the feedback capacitor CF, and the NMOS transistor M1 form the pre-filter 41 at the input end 501. The variable inductor LL, the variable capacitor CL, and the NMOS transistor M1 form the post-filter 43 at the output end. Since the variable inductor LL and the variable capacitor CL are both tunable, the post-filter 43 actually is a tunable bandpass filter with the second intermediate frequency. The feedback capacitor CF, the feedback resistor RF, and the impedance of the input end 501 (generally, 50 ohms) may be impacted by the impedance of the output end 502, the variable inductor LL, and the variable capacitor CL. Thus, the first intermediate frequency of the pre-filter 41 is tuned accordingly when the second intermediate frequency is tuned, and thus the first intermediate frequency and the second intermediate frequency have a coherent-tuning relation with each other. Similarly, the impedance of the output end 502, the variable inductor LL, and the variable capacitor CL may be impacted by the impedance of the input end 501, the feedback capacitor CF, and the feedback resistor RF.

When the frequency of the received signal reaches the second intermediate frequency formed by the variable inductor LL and the variable capacitor CL, the load impedance of the output end 502 is a pure real number. At this time, the reflection coefficient of the input end 501 is the smallest at the first intermediate frequency, such that the signal may enter the NMOS transistor M1. Since the above coherent-tuning relation, the first intermediate frequency equals to the second intermediate frequency. When the frequency of the received signal is far away from the second intermediate frequency, the reflection coefficient is increased as the impedance at the input end 501 is away from 50 ohm, such that the input signal cannot enter the NMOS transistor M1. Therefore, the feedback capacitor CF, the feedback resistor RF, and the NMOS transistor M1 form the pre-filter 41 at the input end 501.

Since the impedance of the input end 501, the feedback capacitor CF, the feedback resistor RF and the impedance of the output end 502, the variable inductor LL, the variable capacitor CL are mutually influenced, the first intermediate frequency and the second intermediate frequency have a coherent-tuning relation with each other. That is to say, the reflection coefficient (the ratio of the reflected signal to the input signal) of the input end 501 and the gain coefficient (the ratio of the output signal to the input signal) of the output end 502 also have the coherent-tuning relation with each other. When the frequency of the input signal equals to the first intermediate frequency and the second intermediate frequency, the reflection coefficient is the smallest and the gain coefficient is the largest.

Figure 5C:
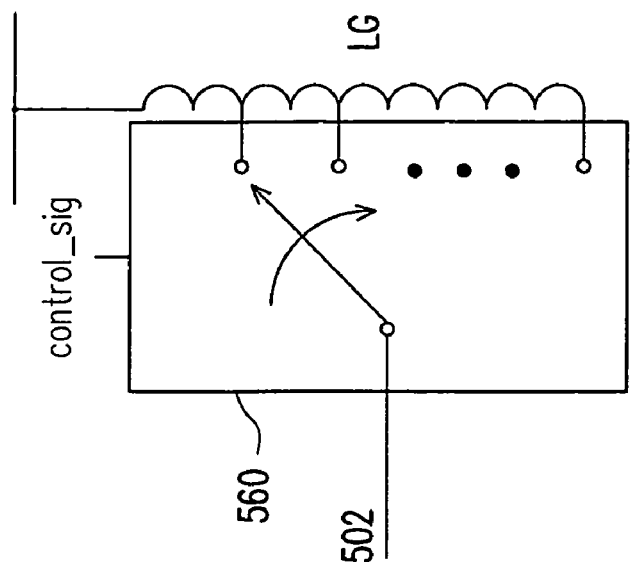
FIGS. 5b and 5c are respectively circuit diagrams of a variable inductor LL.
Figure 5B:
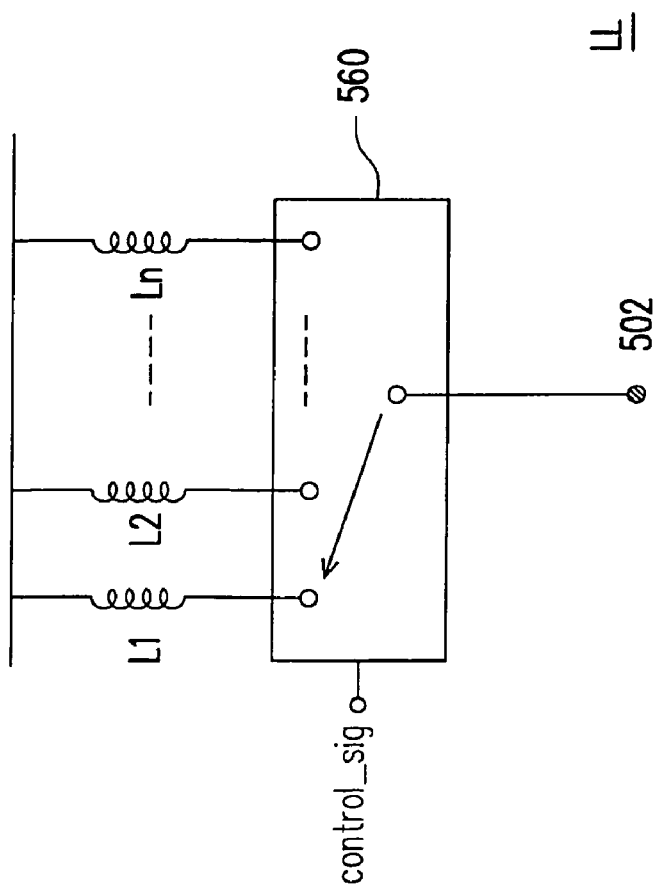

FIGS. 5b and 5c are respectively circuit diagrams of a variable inductor LL. In FIG. 5b, the variable inductor LL includes a selector 560 and a plurality of inductors L1-Ln. The selector 560 is controlled by a control signal control_sig to select the desired inductance. In FIG. 5c, the variable inductor LL includes an inductor LG and a selector 560. As the inductor LG has a plurality of contacts, the selector 560 is controlled by the control signal control_sig to select the contact of the inductor LG, thereby selecting the desired inductance.

Figure 5D:
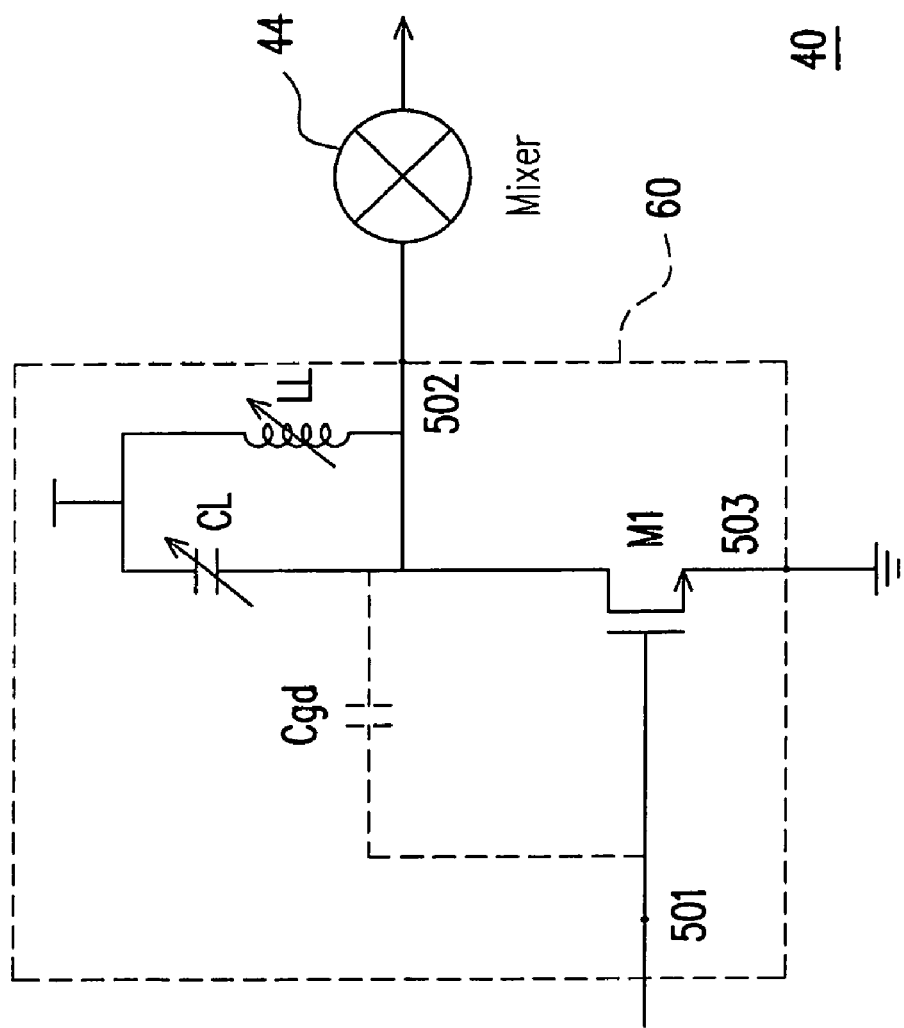
FIG. 5d is a circuit diagram of another integrated circuit 60.
Figure 5E:
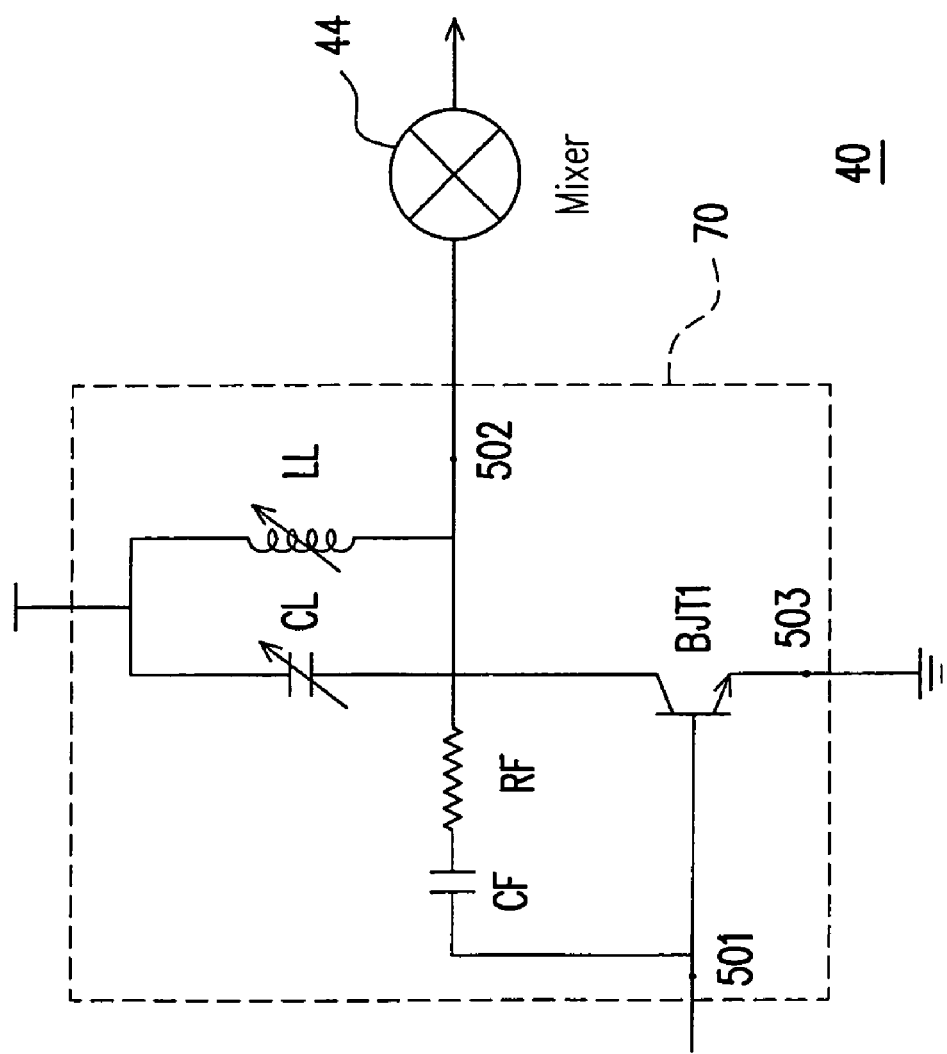
FIG. 5e is a circuit diagram of still another integrated circuit 70.

FIG. 5d is a circuit diagram of another integrated circuit 60. Referring to FIG. 5d, different from the integrated circuit 50, the integrated circuit 60 does not have the feedback resistor RF and the feedback capacitor CF, but uses the parasitic capacitor Cgd of the NMOS transistor M1 placed between the input end 501 and the output end 503 as the feedback capacitor. Therefore, the parasitic capacitor Cgd and the NMOS transistor M1 form the pre-filter 41 at the input end 501. The variable capacitor CL, the variable inductor LL, and the transistor M1 form the post-filter 43 at the output end 503. The operation principle of the integrated circuit 60 is the same as that of the integrated circuit 50, and will not be described again herein.

Figure 5F:
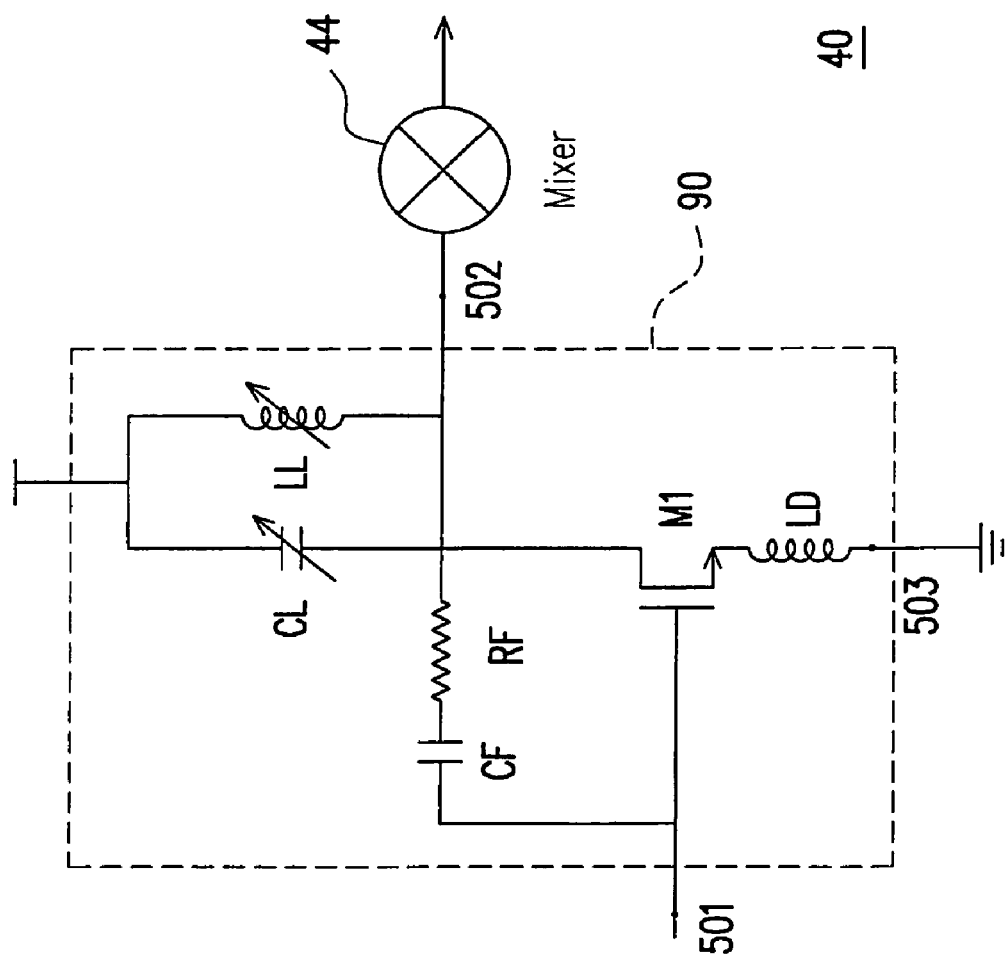
FIG. 5f is a circuit diagram of yet another integrated circuit 90.
Figure 5G:
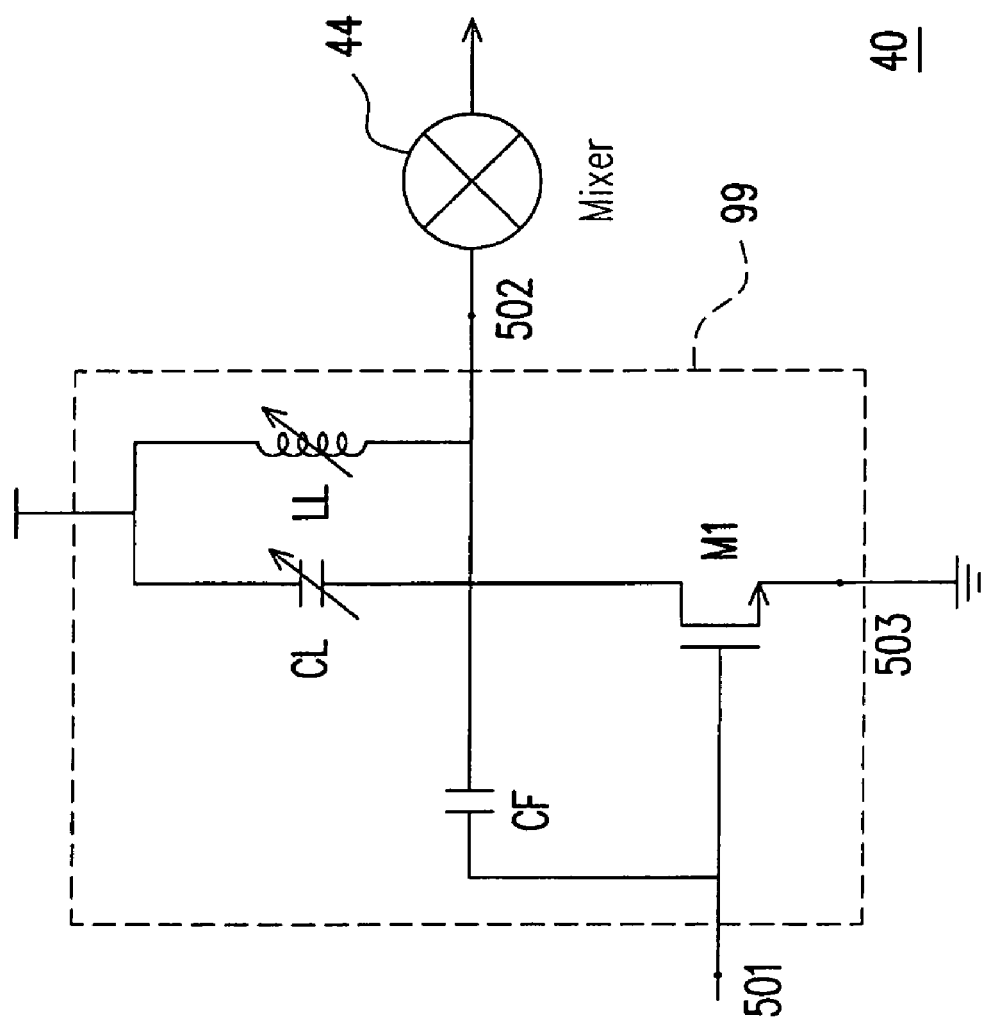
FIG. 5g is a circuit diagram of still another integrated circuit 99.
Figure 5H:
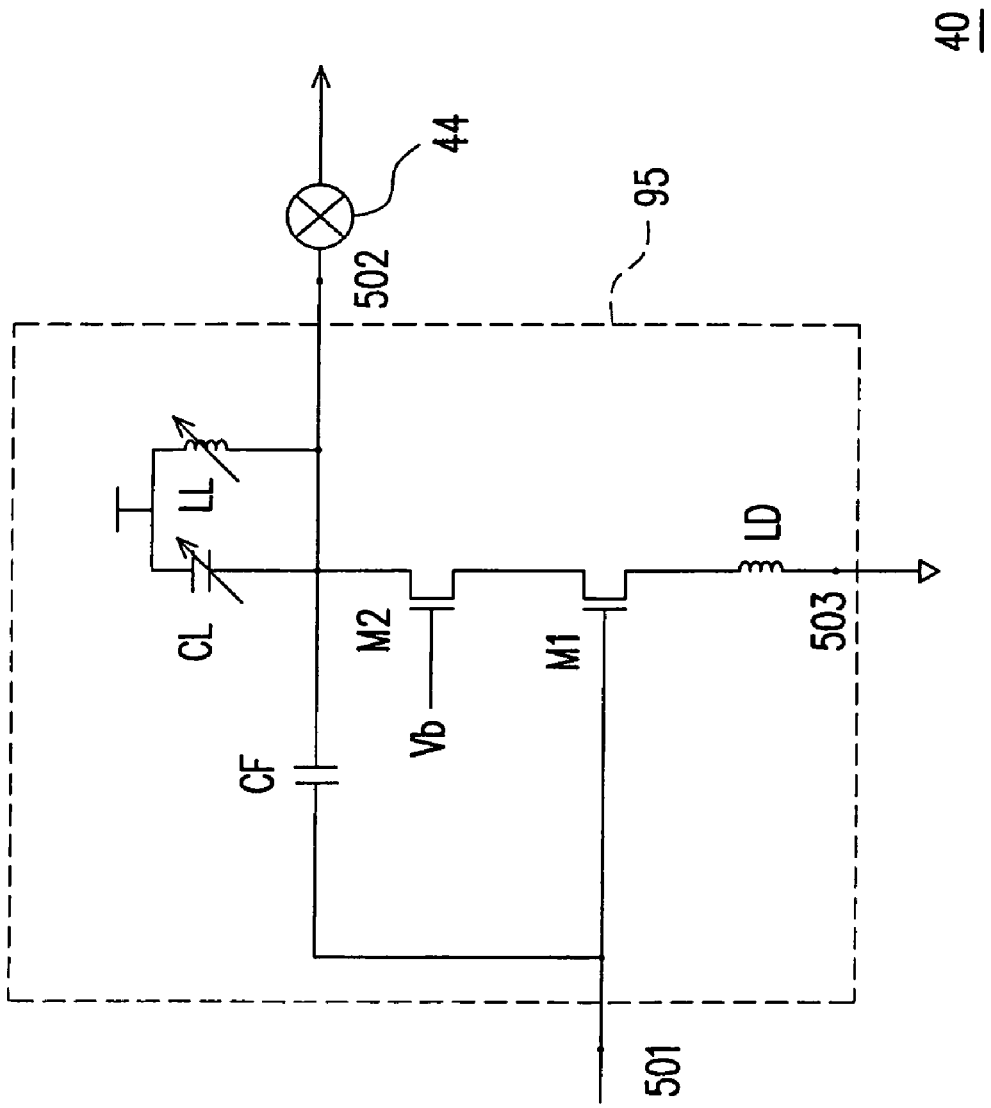
FIG. 5h is a circuit diagram of still another integrated circuit 95.

Referring to FIG. 5e-5h, FIG. 5e is a circuit diagram of still another integrated circuit 70. FIG. 5f is a circuit diagram of yet another integrated circuit 90. FIG. 5g is a circuit diagram of still another integrated circuit 99. FIG. 5h is a circuit diagram of still another integrated circuit 95. Different from the integrated circuit 50, the integrated circuit 70 uses an NPN bipolar junction transistor (NPN BJT transistor) BJT1 to replace the NMOS transistor M1. A collector end of the NPN BJT transistor BJT1 is coupled to the output end, an emitter end of the NPN BJT transistor BJT1 is coupled to the ground end, and a base end of the NPN BJT transistor BJT1 is coupled to the input end. The integrated circuit 90 has an inductor LD added between the ground end 503 and the NMOS transistor M1, for improving the input impedance match of the integrated circuit 90, so as to obtain a better noise figure and improve linearity. The integrated circuit 99 is an embodiment with the resistor RF removed. The operation principles of the integrated circuits 70, 90, 99 are the same as that of the integrated circuit 50, and will not be described herein again. In addition, the integrated circuit 95 has a transistor M2 coupled between the feedback capacitor CF and the transistor M1, and the transistor M2 has a gate end for receiving a bias voltage Vb. The operation principle of the integrated circuit 95 is the same as that described above, and will not be described herein again. Furthermore, the inductor LD is also optional, and the transistor M2 in this embodiment is an NMOS transistor.

Figure 6:
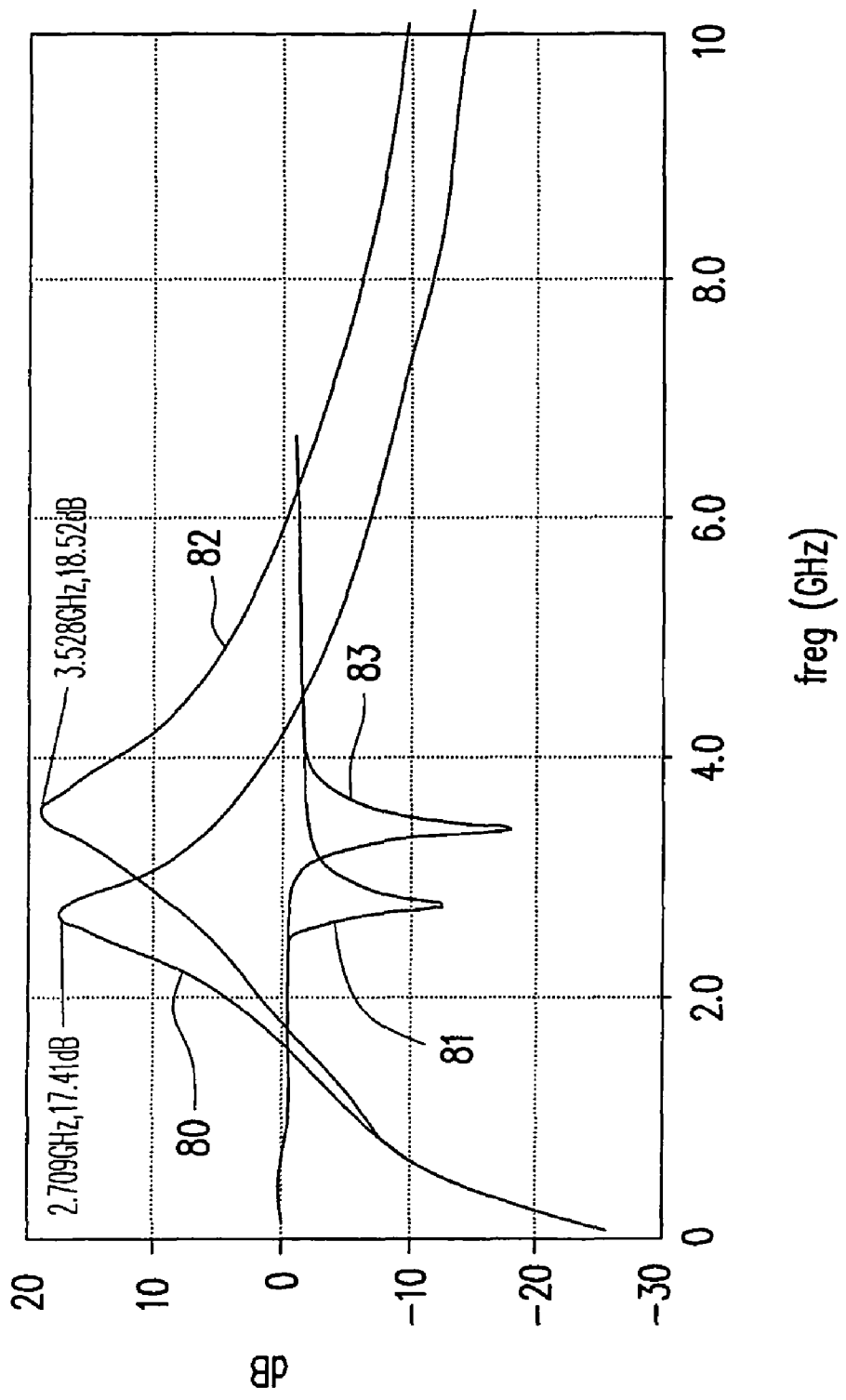
FIG. 6 is a curve diagram of a reflection coefficient and a gain coefficient according to embodiments of the present invention.

FIG. 6 is a curve diagram of a reflection coefficient and a gain coefficient according to embodiments of the present invention. As shown in FIG. 6, when the first intermediate frequency and the second intermediate frequency are 2.709 GHz, the gain coefficient curve 80 reaches 17.41 dB at 2.709 GHz, and the reflection coefficient curve 81 has the minimum value at 2.709 GHz. When the first intermediate frequency and the second intermediate frequency are 3.528 GHz, the gain coefficient curve 82 reaches 18.52 dB at 3.528 GHz, and the reflection coefficient curve 83 has the minimum value at 3.528 GHz. It can be seen from FIG. 6 that the first intermediate frequency and the second intermediate frequency have the above-mentioned coherent-tuning relation with each other.

To sum up, in the embodiments of the present invention, a front-end circuit and a filter apparatus adapted to the front-end circuit are provided. As mentioned above, the front-end circuit and the filter apparatus in the embodiments of the present invention can be applied in the multiband and multi-mode communication system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A front-end circuit with coherent tunable filters, comprising:
    a first filter, with a first tunable intermediate frequency, for filtering a received signal;
    an amplifier, coupled to the first filter, for amplifying an output of the first filter; and
    a second filter, with a second tunable intermediate frequency and coupled to the amplifier, for filtering an output of the amplifier;
    wherein the amplifier is placed between the first filter and the second filter, and the first and second intermediate frequencies have a coherent-tuning relation with each other, wherein the first filter, the second filter, and the amplifier form an integrated circuit, and the integrated circuit comprises:
    an input end, an output end, and a ground end;
    a first transistor, coupled to the input end, the output end, and the ground end;
    a variable capacitor, coupled to the output end; and
    a variable inductor, coupled to the output end;
    wherein the first transistor comprises a parasitic capacitor placed between the input end and the output end.

2. The front-end circuit with coherent tunable filters according to claim 1, further comprising:
    a mixer, coupled to the second filter, for down-converting an output of the second filter.

3. The front-end circuit with coherent tunable filters according to claim 1, wherein the first intermediate frequency equals to the second intermediate frequency, and the coherent-tuning relation means that the first intermediate frequency is tuned accordingly when the second intermediate frequency is tuned, and vice versa.

4. The front-end circuit with coherent tunable filters according to claim 1, wherein the amplifier is a low-noise amplifier.

5. The front-end circuit with coherent tunable filters according to claim 1, wherein the integrated circuit further comprises:
    a feedback capacitor, coupled between the output end and the input end.

6. The front-end circuit with coherent tunable filters according to claim 5, wherein the integrated circuit further comprises:
    a feedback resistor, coupled between the output end and the input end, and connected in series with the feedback capacitor.

7. The front-end circuit with coherent tunable filters according to claim 1, wherein the integrated circuit further comprises:
    a second transistor, coupled between the output end and the first transistor, and with a gate end receiving a bias voltage.

8. The front-end circuit with coherent tunable filters according to claim 1, wherein the integrated circuit further comprises:
    an inductor, coupled between the first transistor and the ground end.

9. A filter apparatus, adapted to a wireless communication front-end circuit, comprising:
- a first filter, with a first tunable intermediate frequency, for filtering an input of the first filter;
- a second filter, with a second tunable intermediate frequency and coupled to the first filter, for filtering an input of the second filter; and
- an amplifier, coupled between the first filter and the second filter, for amplifying an output of the first filter;
- wherein the first and second intermediate frequencies have a coherent-tuning relation with each other, wherein the first filter, the second filter, and the amplifier form an integrated circuit, and the integrated circuit comprises:
- an input end, an output end, and a ground end;
- a first transistor, coupled to the input end, the output end, and the ground end;
- a variable capacitor, coupled to the output end; and
- a variable inductor, coupled to the output end;
- wherein the first transistor comprises a parasitic capacitor placed between the output end and the input end.

10. The filter apparatus according to claim 9, wherein the first intermediate frequency equals to the second intermediate frequency, and the coherent-tuning relation means that the first intermediate frequency is tuned accordingly when the second intermediate frequency is tuned, and vice versa.

11. The filter apparatus according to claim 9, wherein the amplifier is a low-noise amplifier.

12. The filter apparatus according to claim 9, wherein the integrated circuit further comprises:
- a feedback capacitor, coupled between the output end and the input end.

13. The filter apparatus according to claim 12, wherein the integrated circuit further comprises:
- a feedback resistor, coupled between the output end and the input end, and connected in series with the feedback capacitor.

14. The filter apparatus according to claim 9, wherein the integrated circuit further comprises:
- a second transistor, coupled between the output end and the first transistor, and with a gate end receiving a bias voltage.

15. The filter apparatus according to claim 9, wherein the integrated circuit further comprises:
- an inductor, coupled between the first transistor and the ground end.

16. A front-end circuit with coherent tunable filters, comprising:
- an input end, an output end, and a ground end;
- a first transistor, coupled to the input end, the output end, and the ground end;
- a variable capacitor, coupled to the output end; and
- a variable inductor, coupled to the output end;
- wherein the first transistor comprises a parasitic capacitor placed between the output end and the input end; the parasitic capacitor and the first transistor form a first filter at the input end; the variable capacitor, the variable inductor, and the first transistor form a second filter at the output end; the first filter and the second filter respectively comprise a first tunable intermediate frequency and a second tunable intermediate frequency, and the first and second intermediate frequencies have a coherent-tuning relation with each other.

17. The front-end circuit with coherent tunable filters according to claim 16, wherein the first intermediate frequency equals to the second intermediate frequency, and the coherent-tuning relation means that the first intermediate frequency is tuned accordingly when the second intermediate frequency is tuned, and vice versa.

18. The front-end circuit with coherent tunable filters according to claim 16, further comprising:
- a feedback capacitor, coupled between the output end and the input end;
- wherein the feedback capacitor and the first transistor form the first filter at the input end; the variable capacitor, the variable inductor, and the first transistor form the second filter at the output end; the first filter and the second filter respectively have the first tunable intermediate frequency and the second tunable intermediate frequency, and the first and second intermediate frequencies have a coherent-tuning relation with each other.

19. The front-end circuit with coherent tunable filters according to claim 18, further comprising:
- a feedback resistor, coupled between the output end and the input end;
- wherein the feedback capacitor, the feedback resistor, and the first transistor form the first filter at the input end; the variable capacitor, the variable inductor, and the first transistor form the second filter at the output end; the first filter and the second filter respectively have the first tunable intermediate frequency and the second tunable intermediate frequency, and the first and second intermediate frequencies have a coherent-tuning relation with each other.

20. The front-end circuit with coherent tunable filters according to claim 16, wherein the first transistor forms an amplifier.

21. The front-end circuit with coherent tunable filters according to claim 20, wherein the amplifier is a low-noise amplifier.

22. The front-end circuit with coherent tunable filters according to claim 16, further comprising:
- a mixer, coupled to the second filter, for down-converting an output of the second filter.

23. The front-end circuit with coherent tunable filters according to claim 16, wherein the first transistor is an NMOS transistor with a drain end coupled to the output end, a gate end coupled to the input end, and a source end coupled to the ground end or coupled to an end of an inductor, and the other end of the inductor is coupled to the ground end.

24. The front-end circuit with coherent tunable filters according to claim 16, wherein the first transistor is NPN bipolar junction transistor (NPN BJT transistor) with a collector end coupled to the output end, a base end coupled to the input end, and an emitter end coupled to the ground end or coupled to an end of an inductor, and the other end of the inductor is coupled to the ground end.

25. The front-end circuit with coherent tunable filters according to claim 16, further comprising:
- a second transistor, coupled between the output end and the first transistor, and with a gate end receiving a bias voltage.

26. The front-end circuit with coherent tunable filters according to claim 25, wherein the second transistor is an NMOS transistor with a source end coupled to the output end and a drain end coupled to the first transistor.

* * * * *